L. A. YOUNG.
CABLE FASTENER.
APPLICATION FILED AUG. 12, 1911.
1,008,686.
Patented Nov. 14, 1911.
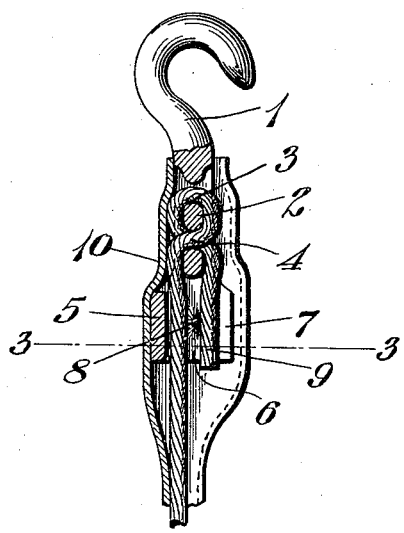
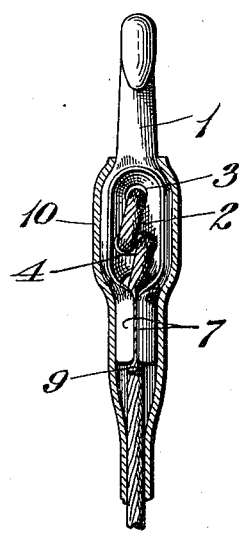
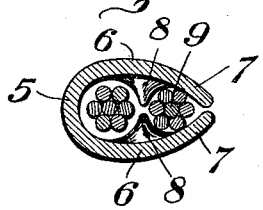
Witnesses
Chas. W. Stauffiger
Anna C. Raviler
Inventor
Leonard A. Young.
By
Attorneys
COLUMBIA PLANOGRAPH CO., WASHINGTON, D. C.

UNITED STATES PATENT OFFICE.

LEONARD A. YOUNG, OF DETROIT, MICHIGAN.

CABLE-FASTENER.

1,008,686.  Specification of Letters Patent.  Patented Nov. 14, 1911.

Application filed August 12, 1911. Serial No. 643,788.

*To all whom it may concern:*

Be it known that I, LEONARD A. YOUNG, a citizen of the United States of America, residing at Detroit, in the county of Wayne and State of Michigan, have invented certain new and useful Improvements in Cable-Fasteners, of which the following is a specification, reference being had therein to the accompanying drawings.

In securing cables, and more particularly those woven or twisted of steel or iron, in places where they are subject to constant vibration, as for example, in standing rigging, in stays for outomobile tops and the like, it is necessary that they be so secured as to undergo this vibration without crystallizing at the places where they are made fast. It is also desirable that the attachment be of such character that a cable secured thereby can be taken up or released if necessary.

This invention relates to cable fasteners wherein provision is made for preventing crystallization of the cable and for taking up slack if necessary.

The invention consists in the matters hereinafter set forth and more particularly pointed out in the appended claim.

In the drawings, Figure 1 is a view partially in section and partially in elevation of a cable stay secured at its extremities by fastening means that embody features of the invention; Fig. 2 is a view in detail of one of the fastening means, partially in elevation and partially in section, taken at right angles to Fig. 1; and Fig. 3 is a view in cross section taken on or about line 3—3 of Fig. 1.

As herein indicated, a hook 1 of suitable material has a shank with a slightly flattened and widened intermediate portion 2 provided with a pair of transverse openings 3 and 4 with smoothly rounded margins. The end portion 5 of the shank is substantially tubular with a pair of bendable lips or walls 6 adapted to be forced together so that their margins 7 are in abutting relation. Interior projections or bosses 8 maintain the opening through the body of the end portion if the margins 7 are brought into contact. To secure a cable or like flexible member to the hook the latter is passed through the bore of the end portion of the shank and in and out through the openings 4 and 3, the free end 9 being brought back between the walls 6 and outside of the projections 8. The walls 7 are then forced together over the cable end, firmly gripping the same and preventing dislodgment. The bore of the tubular portion of the shank, or the axial opening through which the main part of the cable is passed, is arranged to have a greater diameter than that of the inserted cable, so as to leave free play between the shank and the cable. If the cable and fastener is to be used as a stay for an automobile top or the like it may be covered with leather 10 or like weather-proof flexible sheeting, the latter extending well over the openings of the shank. Obviously the portion of the fastener beyond the shank may be either a hook, an eye, a buckle, clip or of any desired form. By this construction a cable is readily secured in the fastener without soldering and without tying the cable. If it is desired to take up any slack the walls gripping the end portion may be temporarily forced apart and the cable drawn taut. As the shank does not come in contact with the cable except at the rounded corners any vibration imparted to the fastener does not tend to crystallize the cable as would be the case if the latter were gripped tightly at the point where it leaves the fastener.

Obviously, changes may be made in the details and construction without departing from the spirit of the invention and I do not care to limit myself to any particular form or arrangement of parts.

What I claim is:—

The combination with a fastener having a shank provided with a pair of transverse openings and with a substantially tubular end portion beyond the openings with a pair of laterally extending walls, and projections on the inner faces of the walls adapted to abut when the walls are forced toward each other, of a cable passing loosely through the tubular portion and in and out the openings, the end portion of the cable being secured between the walls outside the projection.

In testimony whereof I affix my signature in presence of two witnesses.

LEONARD A. YOUNG.

Witnesses:
 C. R. STICKNEY,
 ANNA C. RAVILER.

---

Copies of this patent may be obtained for five cents each, by addressing the "Commissioner of Patents, Washington, D. C."